United States Patent [19]
Anderson et al.

[11] 3,785,055
[45] Jan. 15, 1974

[54] CARPET MEASURING APPARATUS

[76] Inventors: Lloyd E. Anderson, 3123 Upton Ave. North, Minneapolis, 55412; Gilbert L. Alinder, 5312 Shoreview Ave. South, Minneapolis, Minn. 55417

[22] Filed: Feb. 22, 1971

[21] Appl. No.: 117,429

[52] U.S. Cl. .............................................. 33/128
[51] Int. Cl. .............................................. G01b 3/02
[58] Field of Search .............................. 33/128, 139

[56] References Cited
UNITED STATES PATENTS

| | | |
|---|---|---|
| 1,148,765 | 8/1915 | Fobare .................................. 33/139 |
| 156,586 | 11/1874 | McNeill ................................ 33/139 |
| 2,756,507 | 7/1956 | Martin et al. ........................ 33/139 |
| 156,395 | 10/1874 | West .................................... 33/138 |

FOREIGN PATENTS OR APPLICATIONS

| | | |
|---|---|---|
| 8,149 | 6/1900 | Great Britain ....................... 33/139 |

*Primary Examiner*—Louis R. Prince
*Assistant Examiner*—Charles E. Phillips
*Attorney*—Schroeder, Siegfried Ryan & Vidas

[57] ABSTRACT

An apparatus and method for measurement of coiled material in situ is provided wherein a tube is inserted between the convolutions of the coiled material. A cord member having a means for attaching the end thereof to the inner end of the material to be measured passes through the tube. The tube is spirally passed around the convolutions of the coiled material, unwinding cord as it travels. A measure of the cord unwound gives the length of material in the coil.

3 Claims, 2 Drawing Figures

PATENTED JAN 15 1974　　　　　　　　　　　　　　3,785,055

INVENTORS
LLOYD E. ANDERSON
GILBERT L. ALINDER
BY
Schroeder, Siegfried, Ryan
ATTORNEYS

CARPET MEASURING APPARATUS

The present invention is directed to an apparatus and method for the measurement of material that is stored in coils. More particularly, it is directed to such an apparatus and method which is capable of measuring material while in the coiled condition without the necessity for unwinding the material to be measured. The measurement is accomplished by introducing a tube into the coil of material from an end thereof at the innermost end of the material. A cord or line passes through the tube and is attached to the innermost end of the coiled material. The tube is then spirally passed about the convolutions of the coiled material until the outermost end of the material is reached. The amount of cord or line that has been unwound provides an accurate measurement of the material remaining in the coil of material.

Many sheet-like materials are wound into coils for ease of handling, shipping, and storage. As examples of such usage are the common coils of material such as carpeting, yard goods, linoleum and the like. As many of these materials are used in quantities less than an entire roll at one time, it is necessary to periodically inventory the remaining amount of material to ascertain with some degree of precision the stock on hand. As many of the materials have relatively high cost per unit length, it is desirable to have as accurate a measure as possible, both for inventory of remaining stock, as well as for inventorying incoming stock to insure that the quantity being received from the manufacturer is the amount that has been represented.

The most accurate means of ascertaining the amount of material is to unroll the material and measure it in its unrolled condition. This procedure, while accurate, is both time consuming and requires considerable amounts of space. As such, it is undesirable because of the relatively large expense involved in such a procedure.

One may also merely count the number of convolutions in a roll and by estimation come up with values which are indicative of the total length in the roll. The problem in this latter procedure is that the variations in the tightness with which the material is wound, the thickness of the material, and the accuracy of the counting all tend to adversely affect the precision of the measurement.

We have found that an apparatus and method in accordance with our invention, which will be described hereinbelow, provides both a simple and inexpensive technique for measuring the length of material remaining in a coil. The measurement is accomplished by means of an apparatus which is both simple to use and relatively inexpensive. While our invention is useful for a wide variety of coiled materials, it will be described with specific particularity with regard to carpeting. It should be understood that the principles and apparatus in accordance with the invention can be utilized on other materials, so long as these materials are not so tightly wound as to prohibit the use of our principle.

Figure 1:
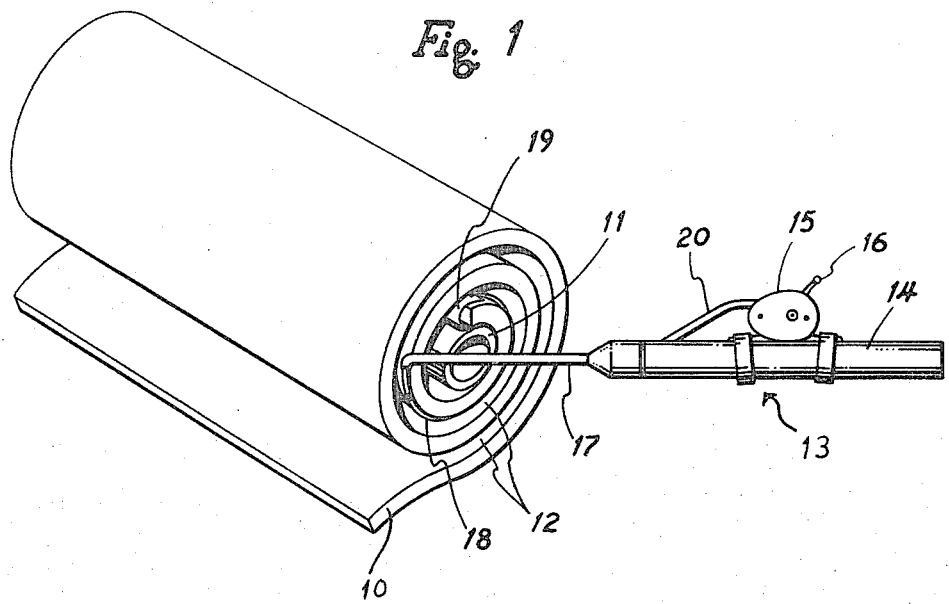
FIG. 1 is a side elevational view of an apparatus in accordance with the invention showing it midway through a measuring operation.

Referring first to FIG. 1, there is shown a roll of material such as carpeting 10 wound about a central mandrel 11. The individual coils of the material 10 are separated by spaces 12. The spaces 12 are, of course, merely shown for purposes of illustration. In an actual coil of material the interval between layers will rarely be of such uniformity or spacing.

The apparatus in accordance with the invention is generally designated 13 and includes a main support rod 14 having mounted on an intermediate portion thereof a reel 15.

Reel 15 may conveniently be of the type commonly used in fishing apparatus. It will consist of a central drum member upon which is wound and unwound a cord or line. A handle means 16 is provided for rewinding the cord or line back onto the reel. Conveniently, reel 15 will contain the usual braking, release and lock mechanisms.

Extending from a forward portion of support rod 14 is a relatively thin tubular member 17 which is illustrated as extending into the space 12 between the convolutions of roll 10. A line 18 is shown in a somewhat schematic form as extending in space 12 around the convolutions of the roll 10. In actual operation, line 18 would be interior to the end of the coil of material to an extent of about one or two inches. At the innermost end of roll 10 and fastened to the outer extremity of line 18 there is located a fastening means 19 which has been placed about the interior end of the roll 10 to prevent line 18 from slipping free as tip 17 passes through the convolutions.

The operation of the invention is now believed apparent. When an individual desires to make a measurement of a coiled piece of carpeting, he inserts the holding means 19 onto the innermost end of the carpeting and then, by forcing the tip of tube 17 about the convolutions of the carpeting in a spiral motion, the line 18 is unwound from reel 15. It should be appreciated that with tightly wound material considerable force may be required to force the tip 17 about the convolutions of the coiled carpeting. For this reason, tubular member 17 should be of relatively strong construction and of a length only so long as is needed to freely pass into the space between the coils of the carpeting. Stainless steel tubing is suitable as a material for tube 17. The operator of the apparatus may utilize both hands on each side of reel 15, in holding rod member 14 to aid in winding the cord 18 about the rolls of the carpeting. It will be noted that the line 18 will follow the back side of the carpeting until the outermost extremity of the carpeting is reached. By a measure of the total amount of cord that has been unwound, one obtains an accurate measurement of the amount of material in the coil.

In many of the materials to which the present invention is adapted, a considerable effort will be required to force tip 17 around the spiral convolutions of a coil. In such instances, it is desirable that cord 18 be of considerable strength and of such a nature as not to elongate under tension. Materials such as nylon cord have adequate strength for the purpose, although they have a tendency to elongate under tension. Of course, any elongation will affect the accuracy of the measurement. We have found that, both for purposes of strength as well as for accuracy, it is desirable that a flexible steel line be used for the purpose. A braided steel line with nylon coating has been found particularly useful for our purpose. Such line is available from the Berkley Line Co. of Spirit Lake, Iowa. This nylon or other plastic coating is likewise of considerable advantage in our invention, as it provides a degree of friction reduction for the cord as it passes through tube 17 and out through the tip thereof.

Figure 2:
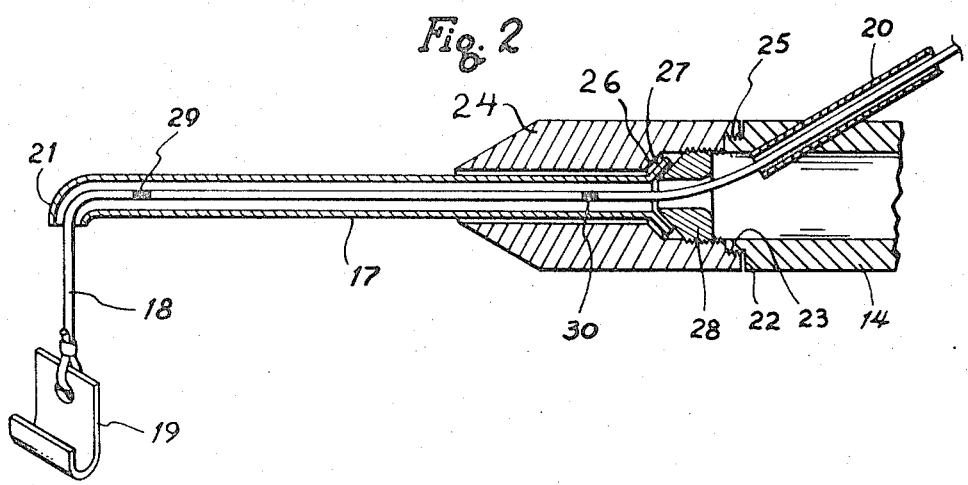
FIG. 2 is a cross-sectional view of the forward portion of the apparatus of FIG. 1.

With any line that is used, it is desirable to minimize the sharp bending of the cord at the point that it exits from tube 17. This will reduce the amount of wear and the danger of kinking or breaking of the cord in service. Referring to FIG. 2, there is illustrated in cross-sectional view one modification of the invention that accomplishes these purposes. The portion illustrated in FIG. 2 is from the tip of tube 17 extending backwardly into the apparatus 13 back to guide tube 20. As can be seen, tube 17, which may be of about ¼ inch OD and 3/16 inch ID, has been formed so that the outermost tip has a right-angle turn. This right-angle turn provides a curved portion 21. The interior surface of portion 21 has a gradual curve over which cord 18 can pass. The projection of the tube 17 beyond the curved portion is desirably relatively short to minimize interference in the operation of the apparatus. The radius of curvature can be increased over that shown in FIG. 2 to give a less acute bend angle to line 18 as it passes out of the opening. In such an instance, the extension of tube 17 will be greater than that shown in FIG. 2.

The main support rod 14 has been shaped to have a shoulder region 22 which is provided with threads 23 on the outer surface thereof. A cap member 24 likewise has a shoulder portion provided with threads that join cap 24 to rod 14. The interior of cap 24 has been shaped so as to provide a bevelled shoulder 26. Rod 17 has been flared so as to conform to bevelled surface 26. The bore through cap 24 is a journal for tube 17 over a portion of tube beginning at flared portion 27. Thus, rod 17 is rotatably mounted within cap 24.

Means such as a threaded nut 28 may be utilized to restrain rod 17 from moving longitudinally within cap 24.

It can thus be seen that rotation of rod 17 provides a means to insure that cord 18 does not pass over a sharpened edge part that would cause undue wear. No matter what position the tip of tube 17 occupies in passing through the convolutions of a roll, the cord will always pass outwardly to the rear of the direction of motion of tube 17.

Also illustrated in FIG. 2 is a guide tube 20 shown in FIG. 1. Guide tube 20 may conveniently be of a flexible plastic material such as polethylene tubing. While not mandatory, we have found that this guide tube is particularly useful, both as a means of restraining cord 18 from becoming loose and entangled at the reel portion thereof, and also as a means for lubrication of the cord during use. We have found that a material such as a silicone grease or oil can be injected into tube 20 and that this grease will aid in lubricating cord 18 for passage through the apparatus in accordance with the invention, thereby minimizing both friction in usage and wear on the cord. The means for introducing the lubricant is provided by a releasable plug in connection between tube 20 and the reel portion 15. By pulling the tube 20 away from reel 15, an opening is provided for introducing the lubricant. The arcuate shape of the tube 20 and the elastic nature of the material hold tube 20 in position during normal operation.

A number of techniques may be utilized to provide a ready measurement of the amount of cord that has been used in an actual measurement. As already noted, one such technique is to measure the cord itself against a rule. This technique, while simpler than unrolling the carpeting, does prove more cumbersome than is necessary.

A second technique is to provide a gearing and numerical indicator arrangement at reel 15 which will positively indicate the number of turns of the reel containing line 18 and thus give a measure of the amount of cord that has been unwound. Such an arrangement is relatively convenient, but adds additional expense to the overall apparatus, and, further, it provides certain inherent problems insofar as maintaining accuracy. The number of turns of cord taken off the reel portion 15 will not always be proportional to the length of cord unwound but will depend to some extent on how many layers of cord are unwound and upon the tension with which the cord is wound. A measuring system based on a technique where cord passes over a drive wheel, which in turn operates a numerical indicator, also is usable. However, any slippage that occurs in the gearing arrangement will produce an error in the indicated measure.

We have found that the simplest and most reliable method is to provide a color coding along line 18 which will provide an instant appraisal to the measurer of how much cord has been utilized. Referring to FIG. 2, there is illustrated color code marks 29 and 30 at two spaced portions along line 18. The spacings may be at any convenient length, depending upon the needs of the user. We have found that a convenient spacing for the marks is at an interval of one foot. When greater precision is needed, a simple hand rule can be utilized to provide intermediate measurements between the foot markings. Suitable color coding can be used to indicate the decimal progression of the amount of cord used. For example, in distances of less than ten feet, a black color at each foot interval can be used. For distances of 11 to 20 feet, a green color would be used. For 21 to 30 feet, a red color would be used, and so forth. Various color combinations can be utilized in addition to the primary decimal coding color to indicate intermediate points within a series. For example, one can utilize as an indicator for the five, fifteen, twenty-five, etc. position within the various decimal positions a short color mark of another color spaced from the primary color. Such marking procedures would have an appearance somewhat analogous to those utilized in marking electrical resistors to give the values thereof.

While the above description has been to the use of our invention where the measurement starts at the center of a roll of carpeting or the like, it should be understood that one can also start at the exterior end of the roll and follow the convolutions with tube 17 to the center. In some instances we have found this procedure is easier in that less force is required to propel tube 17 between the coils. In either event, the measurements will be the same.

We claim:

1. Apparatus for measuring the length of a sheet-like material wound in a coil comprising:
    a. an elongated support member;
    b. a tubular member having a small diameter relative to said support member mounted to one end and extending outwardly along the longitudinal axis of said support member;

c. a reel member mounted to said support intermediate the ends thereof to provide a hand grip portion on said elongated support member forward and to the rear of said reel;
d. a plastic-coated braided steel line wound on said reel with the free end thereof extending through said tubular member; and
e. material engaging means attached to the outer end of said line, said engaging means constructed and arranged to releasably engage an end of a coil of the material to be measured.

2. An apparatus in accordance with claim 1 wherein the plastic coating on said line is nylon and said line has markings on the surface thereof indicating the length from the mark to the outer end of said line.

3. An apparatus in accordance with claim 1 wherein the outer extremity of said tubular member is curved so that the axis of the opening is transverse to the longitudinal axis of said tube and said tubular member is mounted to said support member to freely rotate about its longitudinal axis.

* * * * *